(12) United States Patent  (10) Patent No.: US 7,996,867 B2
Uchida et al.  (45) Date of Patent: Aug. 9, 2011

(54) RESERVATION INFORMATION SETTING APPARATUS AND METHOD THEREOF

(75) Inventors: Mami Uchida, Saitama (JP); Ayumi Mizobuchi, Tokyo (JP); Kasumi Takeda, Tokyo (JP)

(73) Assignee: Sony Corporation (JP)

( * ) Notice: Subject to any disclaimer, the term of this patent is extended or adjusted under 35 U.S.C. 154(b) by 1065 days.

(21) Appl. No.: 09/895,755

(22) Filed: Jun. 29, 2001

(65) Prior Publication Data

US 2002/0049620 A1   Apr. 25, 2002

(30) Foreign Application Priority Data

Jun. 29, 2000   (JP) .............................. P2000-195616

(51) Int. Cl.
  *H04N 7/10*  (2006.01)
(52) U.S. Cl. ............................... 725/58; 725/40; 725/46
(58) Field of Classification Search ............... 725/37–61
  See application file for complete search history.

(56) References Cited

U.S. PATENT DOCUMENTS

| | | | |
|---|---|---|---|
| 5,307,173 A | | 4/1994 | Yuen et al. |
| 5,410,367 A | | 4/1995 | Zahavi et al. |
| 5,805,763 A | * | 9/1998 | Lawler et al. ................... 386/83 |
| 5,880,768 A | | 3/1999 | Lemmons et al. |
| 5,936,625 A | * | 8/1999 | Kahl et al. ..................... 715/775 |
| 5,960,406 A | * | 9/1999 | Rasansky et al. .................. 705/9 |
| 6,018,372 A | * | 1/2000 | Etheredge ....................... 725/44 |
| 6,040,829 A | | 3/2000 | Croy et al. |
| 6,169,543 B1 | * | 1/2001 | Wehmeyer ...................... 725/47 |
| 6,262,722 B1 | * | 7/2001 | Allison et al. ................... 725/39 |
| 6,323,883 B1 | * | 11/2001 | Minoura et al. ............... 715/784 |
| 6,369,840 B1 | * | 4/2002 | Barnett et al. ................ 715/853 |
| 6,481,010 B2 | * | 11/2002 | Nishikawa et al. ............. 725/44 |
| 6,532,589 B1 | * | 3/2003 | Proehl et al. .................... 725/40 |
| 6,826,775 B1 | * | 11/2004 | Howe et al. ..................... 725/40 |
| 7,159,232 B1 | * | 1/2007 | Blackketter et al. ............ 725/38 |
| 2002/0133821 A1 | * | 9/2002 | Shteyn ........................... 725/46 |

FOREIGN PATENT DOCUMENTS

| | | |
|---|---|---|
| CN | 1236263 A | 11/1999 |
| EP | 0 944 253 A1 | 9/1999 |
| JP | 64-008533 U | 1/1989 |
| JP | 4-227380 A | 8/1992 |
| JP | 7-209449 A | 8/1995 |
| JP | 09037176 A | 2/1997 |
| JP | 10-112087 A | 4/1998 |
| JP | 2001-111908 A | 4/2001 |
| JP | 2001128143 A | 5/2001 |
| KR | 1997-0004718 | 1/1997 |
| WO | 96/31980 A1 | 10/1996 |
| WO | 9903271 A1 | 1/1999 |

OTHER PUBLICATIONS

Office Action from Japanese Application No. 2000-195616, dated Apr. 6, 2010.

* cited by examiner

*Primary Examiner* — Hunter B Lonsberry
*Assistant Examiner* — Sumaiya A Chowdhury

(57) ABSTRACT

A reservation information setting apparatus and a method thereof are capable of a setting recording reservation and a program viewing reservation of a target broadcast program correctly and easily. By performing given operations, a control section forms a calendar as a schedule table, and displays the calendar on a display. Schedule information and reservation information, including a program viewing reservation and a recording reservation, are input into a selected date through the displayed calendar.

2 Claims, 7 Drawing Sheets

RESERVATION INFORMATION SETTING APPARATUS AND METHOD THEREOF

CROSS-REFERENCE TO RELATED APPLICATIONS

The present application claims priority from Japanese Application No. P2000-195616, the disclosure of which is hereby incorporated by reference herein.

BACKGROUND OF THE INVENTION

The present invention relates to receivers handling various kinds of broadcast signals including, for example, television broadcasts, radio broadcasts, data broadcasts, satellite broadcasts, and cable television broadcasts, and to recording equipment for recording the broadcast signals.

For example, as in VTR's (video tape recorders) having a built-in tuner, many recording apparatus are provided with a recording reservation function. Concerning this recording reservation function, the broadcast date and time of a broadcast program for which recording is desired, and its broadcast channel, are set in the recording apparatus beforehand. When the set date and time come, the set broadcast channel is automatically selected, and then the target broadcast program is recorded on a recording medium, such as a video tape.

Using this recording reservation function is convenient. Even if a user is scheduled to go out at the date and time of a target broadcast program, the user can record the target broadcast program automatically on a recording medium, and can view it by playing back the recorded broadcast program at the user's convenience.

In addition, receiving apparatus handling satellite broadcasts called STB (Set-Top Box) and IRD (Integrated Receiver/Decoder) are available. Among those apparatus, there is an apparatus having a program viewing reservation function (program reservation function).

This program viewing reservation function sets the following information in the STB or the IRD beforehand: the broadcast date and time of a broadcast program for which viewing is desired; its broadcast channel; and program selection information. When the set date and time come, the set broadcast channel is automatically selected; and the set broadcast program is selected to enable the user to view the target broadcast program.

Using this program viewing reservation function is convenient. Even if the user is viewing a different broadcast program on the broadcast date and time of the target broadcast program, the user never misses the target broadcast program.

By the way, the status of the recording reservation can be checked by displaying a recording-reservation list on a display screen of a monitor apparatus, such as a television receiver, which is connected to a VTR, in the following manner: using a display key for displaying the recording-reservation list, which is provided on the remote command unit (remote controller) of the VTR; or selecting a selection item for displaying the recording-reservation list from a menu included in the VTR.

Moreover, as is the case with the VTR described above, the status of the program viewing reservation can be checked by displaying a program-viewing-reservation list on the display screen of the monitor apparatus in the following manner: using a display key for displaying the program-viewing-reservation list, which is provided on a remote command unit (remote controller) of an apparatus such as an STB and an IRD; or selecting a selection item for displaying the program-viewing-reservation list from a menu included in an apparatus such as an STB and an IRD.

The recording-reservation list and program-viewing-reservation list are special purpose screens that are configured to display reservation setting information including a reserved date, a day of the week, and a broadcast channel using text display and the like. The lists enable the user to check whether or not reservation of a target broadcast program has been set correctly.

However, even if the user can check whether or not the reservations have been properly set by displaying the recording-reservation list and the program-viewing reservation list, the user cannot check whether the recording reservation and the viewing reservation of the broadcast program have been set while taking the user's own schedule into consideration. For example, if the user forgets his/her own schedule of going out, even if the user views the recording-reservation list and the program-viewing reservation list, the user often overlooks the fact that the user forgets the recording reservation and the program viewing reservation of a broadcast program which will be broadcast at the time the user is scheduled to go out.

In addition, the recording reservation and the program viewing reservation are performed by inputting information including broadcast date and time, and a broadcast channel of a target broadcast program into an apparatus such as a recording apparatus, STB, and IRD. However, there is a possibility that a mistake in the recording reservation and the program viewing reservation of the target broadcast program will be caused by a misunderstanding about the broadcast date and time, and the broadcast channel. In this case, it is considered that checking the recording-reservation list and the program-viewing reservation list may not be sufficient to notice the mistake.

SUMMARY OF THE INVENTION

In order to solve the above-mentioned problems, according to a first aspect of the present invention, there is provided a reservation information setting apparatus which includes schedule table forming means for controlling the display of a schedule table that includes calendar information; date selection accepting means for accepting a selection input of a target date in the schedule table; schedule information accepting means for accepting an input of schedule information for the target date; and reservation information accepting means for accepting an input of reservation information, such as a viewing reservation on a recording reservation, for a broadcast program on the target date.

Concerning the reservation information setting apparatus, a signal for displaying the schedule table, which includes calendar information such as year, month, day, and a day of the week, is formed by the schedule table forming means; and this signal permits the schedule table to be displayed on a display element included in the reservation information setting apparatus, or on a display element connected to the reservation setting apparatus by wire or by wireless means.

After that, when the selection input of the target date in the schedule table is accepted by the date selection accepting means, schedule information for the target date is accepted through the schedule information accepting means. Additionally, when the selection input of the target date in the schedule table is accepted by the date selection accepting means, reservation information about broadcast programs on the selected date is accepted through the reservation information accepting means.

This permits the schedule information and the reservation information about broadcast programs to be input through the schedule table that includes the calendar information, enabling viewing reservations and recording reservations for the broadcast programs to be input without misunderstanding the broadcast date and time, and the like. Moreover, a user can input the reservation information for the broadcast programs taking his/her own schedule into consideration.

In addition, the reservation information setting apparatus may further include display instruction accepting means for accepting an input of an instruction to display a broadcast program guide corresponding to the target date if the selection input of the target date is accepted by the date selection accepting means; and broadcast program guide forming means for forming a signal for displaying the broadcast program guide if the input of the instruction to display the broadcast program guide is accepted by the display instruction accepting means; wherein the reservation information accepting means accepts the input of the reservation information through the broadcast program guide.

Concerning the reservation information setting apparatus, when the date selection in the schedule table is accepted by the date selection accepting means, an input of the instruction to display the broadcast program guide corresponding to the accepted date is accepted by the display instruction accepting means.

When the input of the instruction to display the broadcast program guide is accepted by the display instruction accepting means, a signal for displaying the broadcast program guide corresponding to the selected date in the schedule table is formed by the broadcast program guide forming means, and then the broadcast program guide is displayed on the display element according to this signal. Through the broadcast program guide displayed on this display element, the reservation information accepting means accepts the input of the reservation information about the target broadcast program.

As a result, concerning the reservation information about the broadcast programs that will be broadcast on the target date, the reservation information, including viewing reservations and recording reservations of the broadcast programs, can be input and set through easy operation, that is to say, by selecting target broadcast programs from the broadcast program guide displayed on the display element. Therefore, reservation information about the target broadcast programs can be input and set easily and without a mistake.

In addition, in the reservation information setting apparatus, the schedule table forming means may form a signal for displaying the schedule table that includes the schedule information accepted through the schedule information accepting means, and the reservation information accepted through the reservation information accepting means.

Concerning the reservation information setting apparatus, the displayed schedule table may include the schedule information accepted by the schedule information accepting means and the reservation information accepted by the reservation information accepting means.

In this case, the schedule information accepted by the schedule information accepting means and the reservation information accepted by the reservation information accepting means may include information that has been input in the past. Therefore, new reservation information can be input and set without a mistake and easily while checking calendar information, schedule information and reservation information which are included in the schedule table.

In addition, in the reservation information setting apparatus, the broadcast program guide may be an electronic program guide that is based on program guide information included in a broadcast signal.

Concerning the reservation information setting apparatus, for example, in digital broadcasts and the like, of satellite broadcasts and terrestrial broadcasts, a broadcast program guide, which can be used for inputting reservation information for a viewing reservation and a recording reservation and the like, for a broadcast program, may be created using an electronic programming guide (EPG), which is included in a broadcast signal.

The electronic program guide provides the following information: titles of broadcast programs and scheduled broadcast programs; broadcast station names; program content such as a program outline; casts; and the like. In this manner, the broadcast program guide provided to the user can be based upon correct information that is rich in content, and that is supplied from the broadcast station side. The user can set a viewing reservation and a recording reservation of the target broadcast program without a mistake and easily using the provided broadcast program guide.

In addition, according to a second aspect of the present invention, there is provided electronic equipment including a reservation information setting apparatus, including schedule table forming means for controlling the display of a schedule table that includes calendar information; date selection accepting means for accepting a selection input of a target date in the schedule table; schedule information accepting means for accepting an input of schedule information for the target date; and reservation information accepting means for accepting an input of reservation information, such as a viewing reservation or a recording reservation, for a broadcast program on the target date, the reservation information including the target date and a broadcast time on the target date; reservation information storing means for storing the reservation information for the broadcast program on the target date; and viewing control means for controlling the display of the broadcast program upon arrival of the target date and the broadcast time in the stored reservation information.

Concerning the electronic equipment, reservation information accepted by the reservation information accepting means is stored in the reservation information storing means. Upon the arrival of the target date and the broadcast time for a broadcast program stored in the reservation information storing means as viewing reservation information, the viewing control means controls the display of the broadcast program.

This permits the viewing reservation information to be set certainly and easily, and thereby permits the target broadcast program to be automatically viewed according to the viewing reservation information that has been set. Therefore, the target broadcast program will not be missed.

In addition, according to a third aspect of the present invention, there is provided electronic equipment including a reservation information setting apparatus, including schedule table forming means for controlling the display of a schedule table that includes calendar information; date selection accepting means for accepting a selection input of a target date in the schedule table; schedule information accepting means for accepting an input of schedule information for the target date; and reservation information accepting means for accepting an input of reservation information, such as a viewing reservation or a recording reservation, for a broadcast program on the target date, the reservation information including the target date and a broadcast time on the target date; reservation information storing means for storing the reservation information for the broadcast program on the target date; information signal storing means for storing an information signal; and recording control means for controlling the recording of the broadcast program in the information signal storing means upon arrival of the target date and the broadcast time in the stored reservation information.

Concerning the electronic equipment, reservation information accepted by the reservation information accepting means is stored in the reservation information storing means. Upon the arrival of the target date and the broadcast time for a broadcast program stored in the reservation information storing means as recording reservation information, the recording control means controls the recording of the broadcast program.

This permits the recording reservation information to be set certainly and easily, and thereby permits the target broadcast program to be automatically recorded according to the recording reservation information that has been set. Therefore, it is possible to record the target broadcast program certainly.

DETAILED DESCRIPTION

One embodiment of a reservation information setting apparatus and a method thereof according to the present invention is described with reference to the drawings as follows. In the embodiment described below, the reservation information setting apparatus and the method thereof according to the present invention are described using an example of a case where they are applied to a digital television receiver that has a function of receiving satellite broadcasts and functions of recording/playback broadcast programs (hereinafter merely referred to as 'television receiver').

Figure 1:
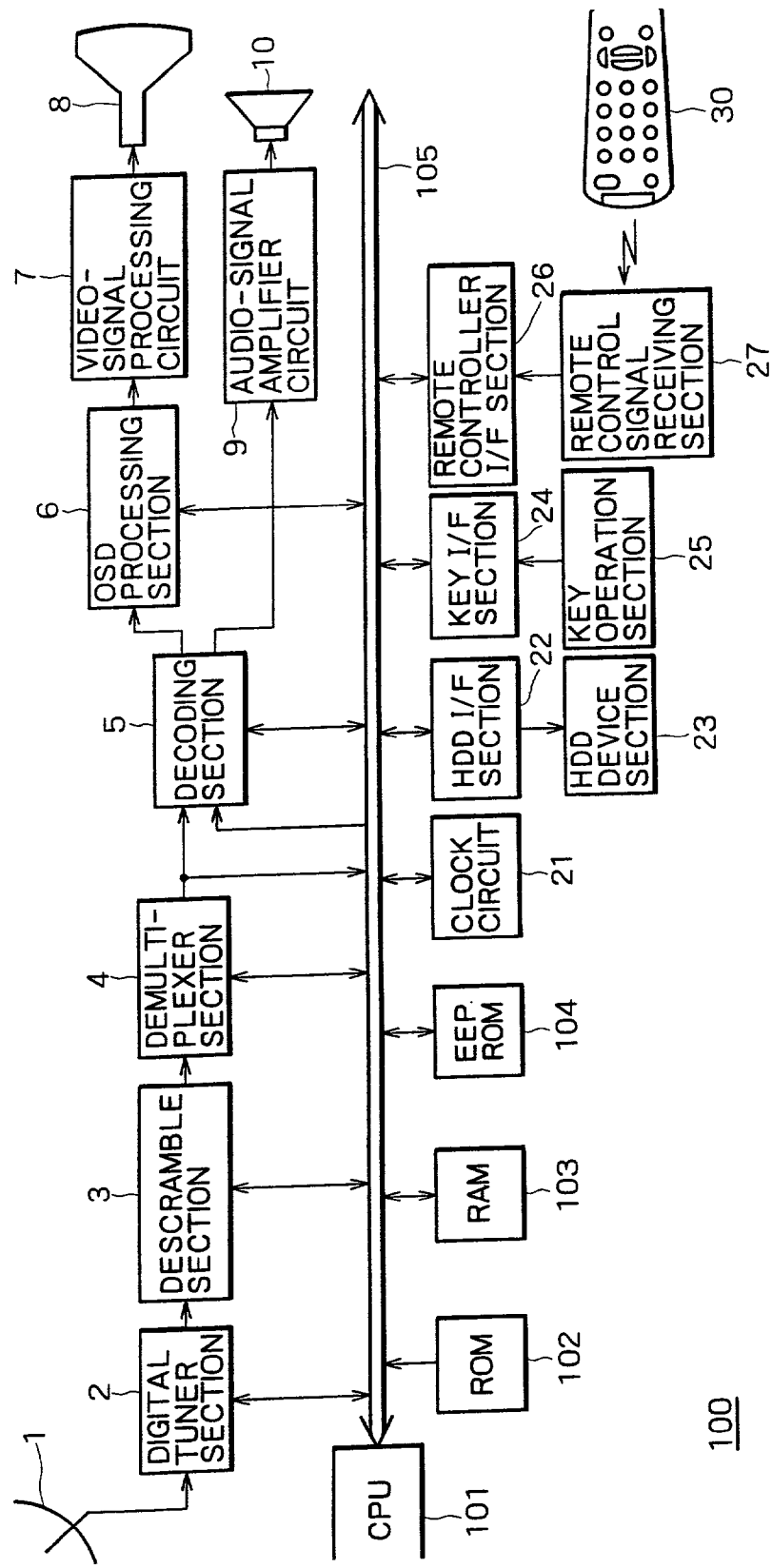
FIG. 1 is an explanatory block diagram illustrating a digital television receiver, to which an embodiment of a reservation information setting apparatus and a method thereof is applied according to the present invention.

FIG. 1 is a block diagram illustrating the television receiver of this embodiment. As shown in FIG. 1, the television receiver of this embodiment comprises a digital tuner section 2 connected to a satellite-broadcast receiving antenna 1, a descramble section 3, a demultiplexer section 4, a decoding section 5, an OSD (On Screen Display) processing section 6, a video-signal processing circuit 7, a display 8, an audio-signal amplifier circuit 9, and a speaker 10.

In addition, as shown in FIG. 1, the television receiver of this embodiment also comprises a control section 100, a clock circuit 21, a hard-disk drive interface section 22 (hereinafter it is abbreviated as "HDD I/F section"), a hard-disk drive device section 23 (hereinafter it is abbreviated as "HDD device section"), a key interface section 24 (hereinafter it is abbreviated as "key I/F section"), a key operation section 25, a remote controller interface section 26 (hereinafter it is abbreviated as "remote controller I/F section"), and a remote control signal receiving section 27.

The control section 100 is a microcomputer in which a CPU 101, a ROM 102, a RAM 103, and an EEPROM 104 are connected via a CPU bus 105 to constitute the microcomputer which controls each section of the television receiver of this embodiment. The ROM 102 stores processing programs executed in this television receiver, required data, and the like.

Moreover, the RAM 103 is mainly used as a work area for storing temporarily a result of processing being executed in midstream, and the like. The EEPROM 104 is a memory for storing various kinds of parameter information set by a user, and other information. Additionally, the EEPROM 104 is a so-called nonvolatile memory that is configured to prevent stored information from being lost even if the power supply to the television receiver is interrupted.

Moreover, in FIG. 1, the remote controller 30 is a remote controller for the television receiver of this embodiment, and generates and transmits an infrared remote-control signal in response to an operation input from the user. The remote controller 30 has a power on/off key, a channel key for channel selection, a channel up/down key, and a volume up/down key. The remote controller 30 also has an up arrow key, a down arrow key, a left arrow key, a right arrow key, other various function keys, and the like, which are, for example, used for selecting a date in a calendar as a schedule table described later, selecting a program from an EPG (Electronic Programming Guide), and the like.

An infrared remote control signal, which has been transmitted from the remote controller 30 in response to a key pressed by the user, is optically received by the remote control signal receiving section 27 of the television receiver of this embodiment, and then is converted into an electric signal. The remote control signal converted into this electric signal is supplied to the control section 100 through the remote controller I/F section 26.

As a result, the control section 100 forms a control signal for controlling each section in response to the remote control signal. The control section 100 is configured to perform various kinds of controls including power on/off, channel selection, and volume adjustment by supplying this control signal to each related section in response to an instruction from the user.

In the television receiver of this embodiment, power supply, reception of satellite broadcast signals, channel selection processing, and the like, are performed as described below. To be more specific, a satellite broadcast signal received by the satellite-broadcast receiving antenna 1, which is installed in an outdoor location, is supplied to the tuner section 2.

The tuner section 2 selects and demodulates a satellite-broadcast signal according to a channel-selection control signal from the control section 100, and supplies the demodulated satellite broadcast signal to the descramble section 3. The channel-selection control signal from the control section 100 is formed in the control section 100 in response to the input of a channel-selection operation by the user, which has been accepted through the remote controller 30.

The descramble section 3 is provided with, for example, key information for decryption by the control section 100, descrambles (decrypts) scrambled data (encrypted data) processed for the satellite broadcast signal that has been received and selected, and then supplies the descrambled satellite broadcast signal to the demultiplexer section 4.

The satellite broadcast signal is multiplexed with digital data of a plurality of broadcast programs, digital data for forming an electronic program guide called EPG, and the like (by means of what is called time-division multiplexing). Therefore, information including the plurality of broadcast programs and the EPG can be delivered by a satellite broadcast signal of one channel.

Because of it, in the demultiplexer section 4, a video signal and an audio signal of the broadcast program selected by the user are extracted from the satellite broadcast signal from the descramble section 3 according to the program selection control signal from the control section 100. Then, the demultiplexer section 4 supplies the video signal and the audio signal of this extracted broadcast program to the decoding section 5.

In addition, the demultiplexer section 4 extracts data for forming an EPG using the satellite broadcast signal from the descramble section 3, and supplies the data to the control section 100. This permits the control section 100 to form the EPG according to the data for forming the EPG from the demultiplexer section 4, and to provide this EPG according to an instruction from the user.

Additionally, in the television receiver of this embodiment, the video signal and the audio signal of the broadcast program, which have been extracted and output in the demultiplexer section 4, are compressed by means of a given encoding method such as, for example, an MPEG (Motion Picture Expert Group) method.

Because of it, as described below, the decoding section 5 performs decompression processing of the video signal and the audio signal so that the data can be processed in the television receiver of this embodiment. To be more specific, the decoding section 5 of the television receiver of this embodiment comprises an audio-signal decoding section and a video-signal decoding section although those sections are not shown in the diagram. The decoding section 5 performs decompression processing for the video signal and the audio signal, which have been supplied, according to the given encoding method to reconstruct the original digital video signal before data compression, and to reconstruct the original digital audio signal before data compression.

Additionally, the decoding section 5 performs D/A conversion (digital-to-analog conversion) for the reconstructed digital video signal to form an analog video signal, and supplies the analog video signal to the OSD processing section 6. Moreover, the decoding section 5 performs D/A conversion (digital-to-analog conversion) for the reconstructed digital audio signal to form an analog audio signal, and supplies the analog audio signal to the audio-signal amplifier circuit 9.

The OSD processing section 6 performs video signal processing to display an EPG, a calendar as a schedule table described later, or various kinds of messages in response to the data supplied from the control section 100. The OSD processing section 6 is a so-called text/graphic processing circuit for displaying information such as text, which is not a video of a broadcast program.

For example, when text information showing a selected channel, a volume bar for showing a volume level, and the like, are to be displayed according to an instruction from the user, information for displaying them is supplied from the control section 100 to the OSD processing section 6. After that, the display supplied from the control section 100, which includes the text showing the selected channel, and the volume bar, is superimposed on the video signal of the broadcast program. Then, the superimposed signal is supplied to the video-signal processing circuit 7.

In addition, when displaying an EPG according to an instruction from the user, information for forming the EPG is supplied from the control section 100 to the OSD processing section 6. After that, in the OSD processing section 6, the video signal for displaying the EPG is formed, and then this video signal is supplied to the video-signal processing circuit 7.

The video-signal processing circuit 7 forms signals in a format for supplying to the display 8 (for example, three primary-color signals of R (red), G (green), and B (blue)) from the supplied analog video signals. Then, the video-signal processing circuit 7 supplies the signals to display 8.

The display 8 is a CRT (Cathode-Ray Tube) display in this embodiment, and displays the video in response to the supplied video signal in its own display screen. Therefore, the video of the broadcast program, which has been delivered by the satellite broadcast signal and has been selected by the user, is displayed in the display screen of the display 8.

On the other hand, the audio-signal amplifier circuit 9 amplifies the supplied analog audio signal to a required level, and then supplies this signal to a speaker 10. Therefore, the audio of the broadcast program, which has been delivered by the satellite broadcast signal and has been selected by the user, is output from the speaker 10.

In this manner, it is possible to receive and select the satellite broadcast signal, and to deliver the signal to the user. Moreover, in the television receiver of this embodiment, as shown in FIG. 1, the HDD device section 23, which is capable of recording data on the hard disk or of reading data recorded on the hard disk, is connected to the control section 100 via the HDD I/F section 22.

In this embodiment, when a recording instruction is given by the user's operation of the remote controller 30, such as pressing a recording key of the remote controller 30, or the like, the signal of a broadcast program extracted by the demultiplexer section 4 (the video signal and the audio signal of the broadcast program) is supplied to the HDD device section 23 via the control section 100 and the HDD I/F section 22. As a result, the signal of the broadcast program can be recorded on a hard disk of the HDD device section 23.

In addition, when an instruction to play back the recorded broadcast program is given by the user's operation of the remote controller 30, such as pressing a playback key of the remote controller 30, or the like, the HDD device section 23 reads the video signal and the audio signal of the broadcast program recorded on the hard disk contained therein, and supplies those signals to the decoding section 5 via the HDD I/F section 22 and the control section 100.

As a result, as described above, in the decoding section 5, decompression processing and D/A conversion are performed for the video signal and the audio signal of the broadcast program recorded on the hard disk of the HDD device section 23. Then, the video of the broadcast program is displayed on the display screen of the display 8, and the audio of the broadcast program is output from the speaker 10.

In this manner, the television receiver of this embodiment has recording/playback functions that enable the user to record a broadcast program provided by a satellite broadcast on the hard disk and to play back and view the program at any time.

Moreover, the television receiver of this embodiment has the key operation section 25, which is connected through the key I/F section 24. This allows the user to perform operations such as switching on/off the main power supply through the key operation section 25.

[Schedule Management Function, Program Viewing Reservation Function, and Recording Reservation Function]

Furthermore, the television receiver of this embodiment is provided with the clock circuit 21 as shown in FIG. 1. The clock circuit 21 is configured to provide the user with the current time, and also has a calendar function that provides information on year, month, day, day of the week, and the like.

In addition, the television receiver of this embodiment has a schedule management function for managing the schedule of the user in the television receiver by using the calendar function to make a calendar used for a schedule table and by entering schedule information in the calendar.

Moreover, the television receiver of this embodiment also has the program viewing reservation function and the recording reservation function. The television receiver, therefore, is configured to enable the user to input reservation information about program viewing reservations and recording reservations without a mistake and to easily use the calendar as the schedule table and the EPG, which are displayed on the display 8, to store the reservation information in the television receiver of this embodiment.

Figure 2:
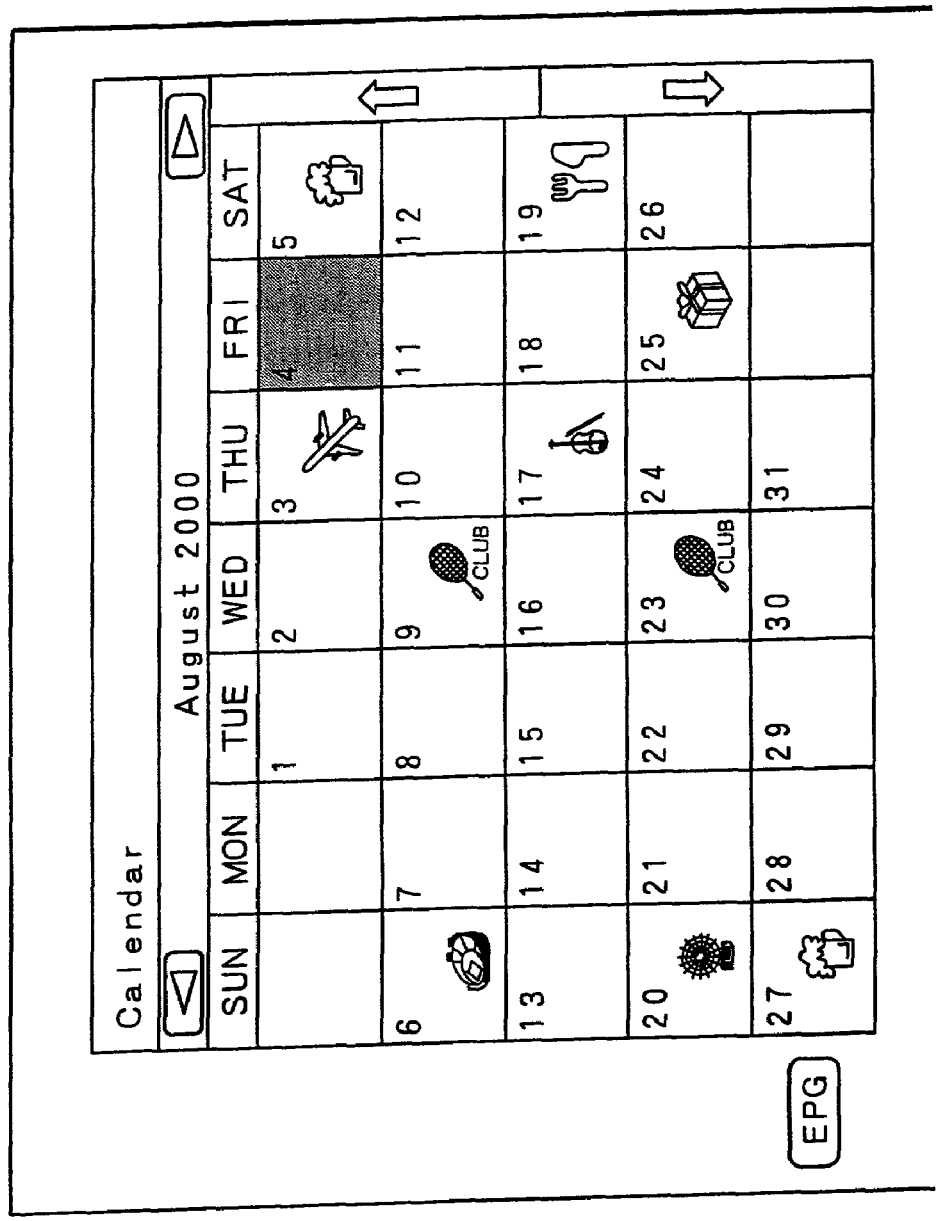
FIG. 2 is an explanatory diagram illustrating a display example of a calendar as a schedule table used in the digital television receiver shown in FIG. 1.

FIG. 2 is an explanatory diagram illustrating an example of the calendar as the schedule table (schedule management table), which is displayed on the display screen of the display 8 of the television receiver. The calendar shown in this FIG. 2 is displayed on the display screen of the display 8 of the television receiver by performing a predefined calendar displaying operation; for example, pressing a calendar calling key that is provided as a function key in the remote controller 30.

As shown in FIG. 2, the calendar displays one month at a time on the display 8 of the television receiver. The calendar shown in this FIG. 2 is an example of a calendar of August 2000. On an upper side of a "day of the week" display column of the calendar shown in FIG. 2, "August 2000" is displayed to enable the user to know the month indicated by the calendar. Moreover, in the case of the calendar in the example shown in FIG. 2, a pictograph (pattern) corresponding to the content of the schedule can be displayed on each day there is something scheduled.

The calendar is configured to display a pictograph, which corresponds to the content of the schedule, in a display area corresponding to a day when there is something scheduled in the following manner: for example, using a pictograph showing a fork and a knife for a day when there is a promise to have a meal; and using a pictograph showing a musical instrument for a day when there is a schedule to go to a concert; and the like. Of course, as described later, the calendar is configured to allow the user to input text information showing a time, place, and the like, in a display area corresponding to a day when there is something scheduled, to display the text information.

In the case of the television receiver of this embodiment, a target date can be selected by changing a cursor position, which moves on a date basis on the displayed calendar, using the up arrow key, the down arrow key, the left arrow key, and the right arrow key of the remote controller 30.

In this embodiment, an area corresponding to a date, on which a cursor is located, is highlighted. In the case of the example of FIG. 2, the area corresponding to the fourth of August is highlighted, indicating that the cursor is located on the fourth of August. In this case, the cursor position is also managed in the control section 100. After the cursor is located on the target date, when the data is selected by pressing a decision key of the remote controller 30, a schedule input screen for inputting a schedule for the selected day is displayed.

Figure 3:
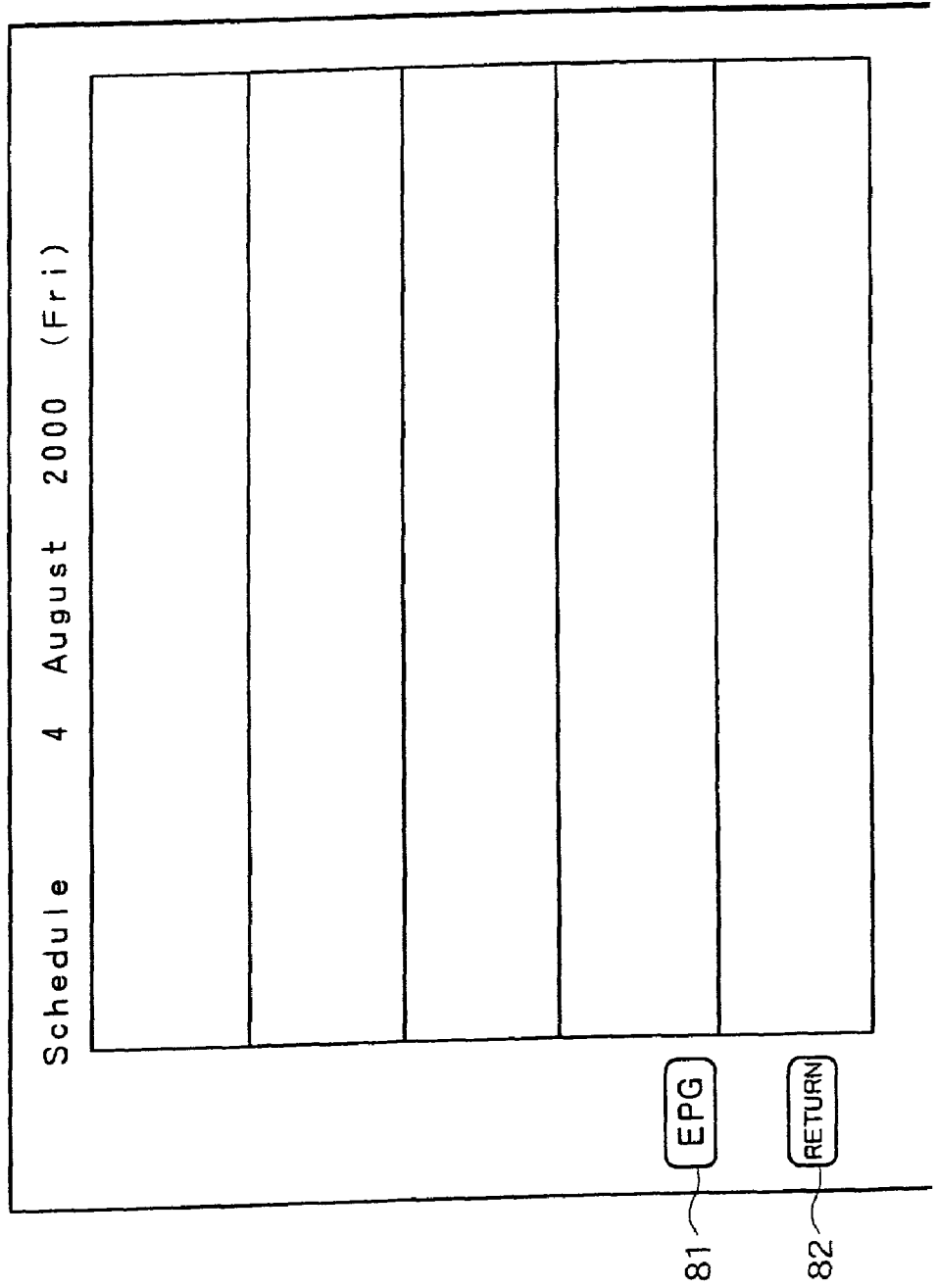
FIG. 3 is an explanatory diagram illustrating a display example of a schedule input screen that allows the input of schedule information into a calendar as a schedule table.

FIG. 3 is an explanatory diagram illustrating an example of the schedule input screen that is displayed on the display 8 of the television receiver of this embodiment. When the schedule input screen shown in FIG. 3 is displayed, specific information about a schedule on the selected day, for example, text information including time to meet and a place to meet can be input by operating the remote controller 30.

In this embodiment, a character, which can be input, is allocated to each key of the remote controller 30. Therefore, the text information can be input by operating the remote controller 30. Additionally, it is possible to input the text information by the following operation: performing a given operation to display a software keyboard for text-information input on the display screen of the display 8; and using the displayed software keyboard from the remote controller 30 to select characters.

Moreover, the schedule input screen shown in FIG. 3 is configured to display an available pictograph list which enables the user to select a pictograph corresponding to the content of the schedule. Therefore, the user can input a pictograph instead of the text information, or input both the text information and the pictograph.

Then, after the text information and the pictograph have been input, when the decision key of the remote controller 30 is pressed, the text information and the pictograph are displayed as schedule information in the calendar shown in FIG. 2. Moreover, the input information is recorded on a recording medium, for example, the EEPROM 104, or a hard disk of the HDD device section 23, in the television receiver.

Moreover, the television receiver of this embodiment is configured to allow the user to select either an EPG icon 81 or a return icon 82 shown on the left end portion of FIG. 3 by using, for example, the up arrow key and the down arrow key of the remote controller 30.

In this case, in the schedule input screen shown in FIG. 3, if the return icon 82 is selected, the process returns to the calendar display screen shown in FIG. 2, allowing the user to select a date. Alternatively, if the EPG icon 81 is selected, the control section 100 of the television receiver creates an EPG of the date selected in the calendar of FIG. 2, and displays this EPG on the display screen of the display 8 of the television receiver.

Figure 4:
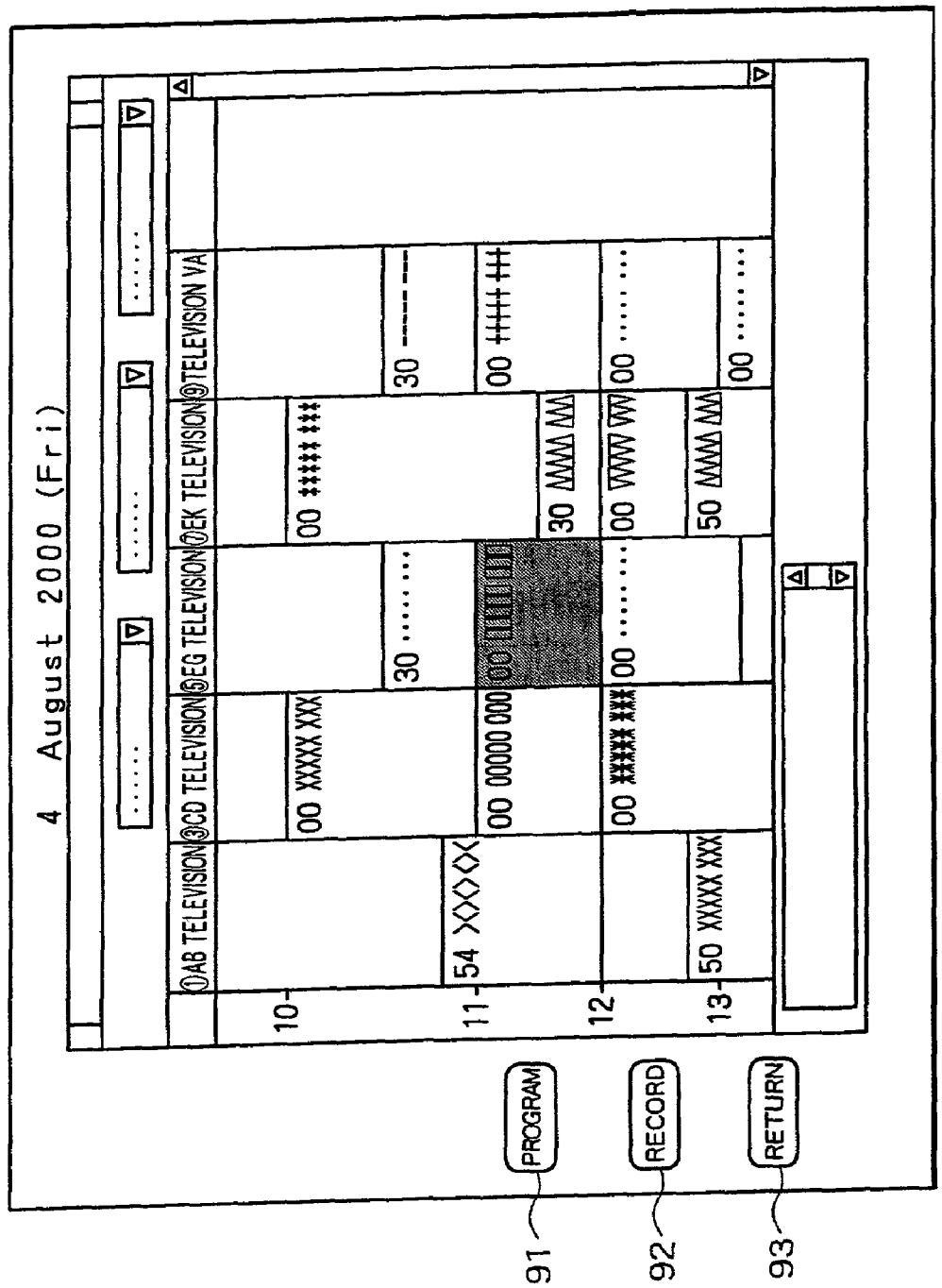
FIG. 4 is an explanatory diagram illustrating a display example of a broadcast program guide used in the digital television receiver shown in FIG. 1.

FIG. 4 is an explanatory diagram illustrating a display example of an EPG of a selected date (Aug. 4, 2000), which is displayed on the television receiver of this embodiment. In the case of the EPG example shown in FIG. 4, broadcast stations (broadcast channels) which can be selected are aligned in the display screen of the display 8 in the horizontal direction, while a time axis is provided in the vertical direction. Information about a broadcast program of each broadcast channel for each period of time is displayed on the display screen.

In this embodiment, the information about the broadcast program includes the following: start time, a title, casts, and the like, in relation to the broadcast. Moreover, in the case of this EPG, as is the case with the date selection in the calendar shown in FIG. 2, the user can locate the cursor on a display area of information about a target broadcast program by using the up arrow key, the down arrow key, the left arrow key, and the right arrow key of the remote controller 30.

In the case of the example shown in FIG. 4, concerning broadcast time from 11 a.m. in the ⑤ EG television column, the cursor is located on the display area of broadcast program information for one hour; and the display area of the broadcast program information on which the cursor is located is highlighted. Additionally, the control section 100 of the television receiver is configured to manage the cursor position, to identify which broadcast program has been selected, and to identify the day, the broadcast channel, and the period of time, in relation to the selected broadcast program.

By the way, in FIG. 4, concerning displayed items including ① AB television, ② CD television, and ⑤ EG television, figures including ①, ②, and ⑤ . . . correspond to channel numbers for identifying the broadcast channels (transmission paths). To be more specific, ① is channel 1 (1 ch), ② is channel 2 (2 ch), and ⑤ is channel 5 (5 ch).

Moreover, on the EPG shown in FIG. 4, when locating the cursor on the display area of information about the target broadcast program and pressing the decision key of the remote controller 30, the broadcast program on which the cursor is located is selected. As a result, setting a program viewing reservation or a recording reservation of the broadcast program (registration) becomes possible.

As regards the television receiver of this embodiment, as described using FIG. 4, when the target broadcast program is selected and decided on the EPG displayed on the display 8, the user is allowed to select one of a program viewing reservation icon 91, a recording reservation icon 92, and the return icon 93, which are displayed on the left end portion of the screen shown in FIG. 4, by using, for example, the up arrow key and the down arrow key of the remote controller 30.

In this case, the program viewing reservation icon 91 is used for instructing to perform a program viewing reservation, and the recording reservation icon 92 is used for instructing to perform a recording reservation. In addition, as is the case with the return icon 82 in the schedule input screen shown in FIG. 3, the return icon 93 is used for instructing to return to the calendar display shown in FIG. 2.

Moreover, when the recording reservation icon 92 is selected using the up arrow key and the down arrow key of the remote controller 30 and then the decision key of the remote controller 30 is pressed, the control section 100 of the television receiver performs a reservation recording setting process as follows: hiding the EPG display; returning to the calendar display described above using FIG. 2; displaying information about the broadcast program for which recording has been reserved in a display area for the selected date; and recording the setting information of the recording reservation on the EEPROM 104 of the television receiver.

Figure 5:
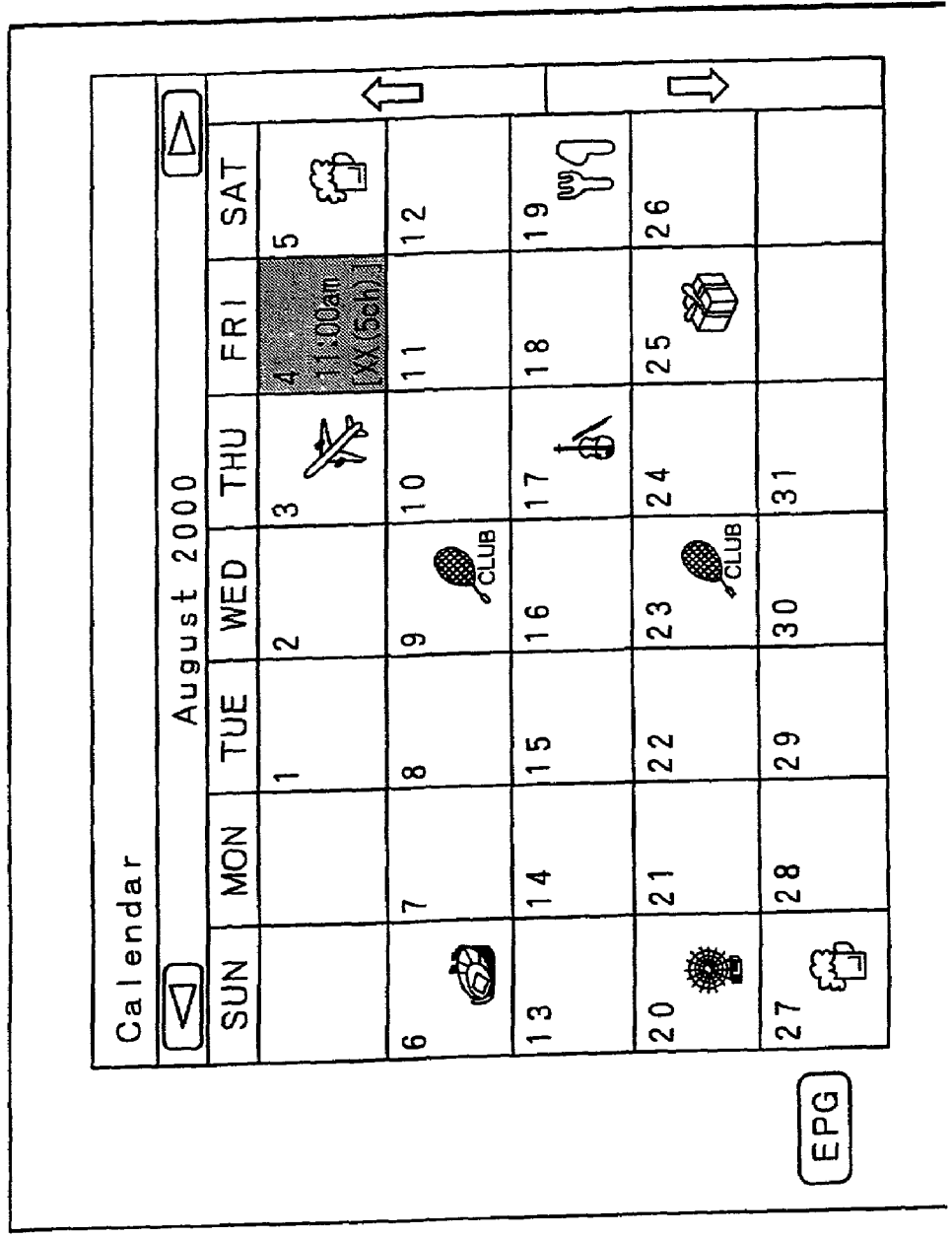
FIG. 5 is an explanatory diagram illustrating a display example of a calendar as a schedule table that permits reservation information to be displayed.

FIG. 5 is an explanatory diagram illustrating an example of a calendar display that is configured to display information about a broadcast program for which recording has been reserved. In this embodiment, as described above using FIG. 2, Aug. 4, 2000 is selected in the calendar displayed on the display 8. In addition, as described above using FIG. 4, a broadcast program from 11 a.m. of ⑤ EG television column (a program for which a period of broadcast time is one hour) is selected on the EPG displayed on the display 8.

Because of it, in the case of this example, as shown in FIG. 5, in the calendar of August 2000, a display column showing a schedule on the fourth is highlighted. In that display column, the following are displayed: "11:00 am" that is information showing the start time of the broadcast program for which recording has been reserved; and "xx (5 ch)" that is information showing the broadcast channel of the broadcast program.

Moreover, in this embodiment, the setting information of the recording reservation recorded in the EEPROM 104 includes recording start-time information, recording end-time information, broadcast channel information, and program selection information. The setting information is kept in the control section 100 that created the EPG. The information about the broadcast program selected in the displayed EPG is extracted and is used as display information or as setting information recorded in the EEPROM 104.

When the setting information of the recording reservation is recorded in the EEPROM 104, the control section 100 of the television receiver monitors the clock circuit 21 according to the setting information of the recording reservation in the EEPROM 104. When the control section 100 detects that the broadcast time of the broadcast program for which recording has been reserved has arrived, the control section 100 performs the following: controlling each section of the television receiver; supplying power to the television receiver; receiving and selecting the broadcast channel of the target broadcast program; selecting the target broadcast program; and recording the broadcast program on the hard disk of the HDD device section 23.

By the way, in this case, an example is described of a case where a recording reservation of the target broadcast program is performed. However, program viewing reservation can also be performed almost in the same manner. To be more specific, as described using FIG. 4, selecting and deciding the target broadcast program on the EPG displayed on the display 8 enables the user to select the program viewing reservation icon 91, the recording reservation icon 92, and the return icon 93.

Moreover, when the program viewing reservation icon 91 has been selected using the up arrow key and the down arrow key of the remote controller 30 and then the decision key of the remote controller 30 is pressed, a program viewing reservation setting process is performed as follows: hiding the EPG display; displaying information about the broadcast program for which program viewing has been reserved in the schedule table described above using FIG. 2; and recording the setting information of the program viewing reservation on the EEPROM 104 of the television receiver.

Additionally, in the case of the program viewing reservation, information such as the start time of the broadcast program for which program viewing has been reserved, and a broadcast channel of the broadcast program, is displayed on the calendar as the schedule table. Moreover, the program start-time information, the program end-time information, the broadcast channel information, and the program selection information are recorded on the EEPROM 104 as setting information of the program viewing reservation. When the setting information of the program viewing reservation is recorded in the EEPROM 104, the control section 100 of the television receiver monitors the clock circuit 21 according to the setting information of the program viewing reservation in the EEPROM 104.

Then, when the control section 100 detects that the broadcast date and time of the broadcast program for which program viewing has been reserved has arrived, the control section 100 performs the following: controlling each section of the television receiver; receiving and selecting the broadcast channel of the target broadcast program; selecting the target broadcast program; and even when another broadcast program is being viewed, selecting the broadcast signal of the broadcast program for which program viewing has been reserved, and selecting the target broadcast program to allow the user to view the target broadcast program.

In this manner, in the schedule input screen shown in FIG. 3, when the user wants to input reservation information about a broadcast program including a program viewing reservation and a recording reservation, which is not a schedule information input, the user can input the program viewing reservation and the recording reservation of the target broadcast program in the television receiver for setting only by the following simple operation: displaying an EPG of the selected day on the display 8, and selecting the target broadcast program through the displayed EPG.

[Setting Process for Schedule Information Input, Program Viewing Reservation, and Recording Reservation]

Figure 6:
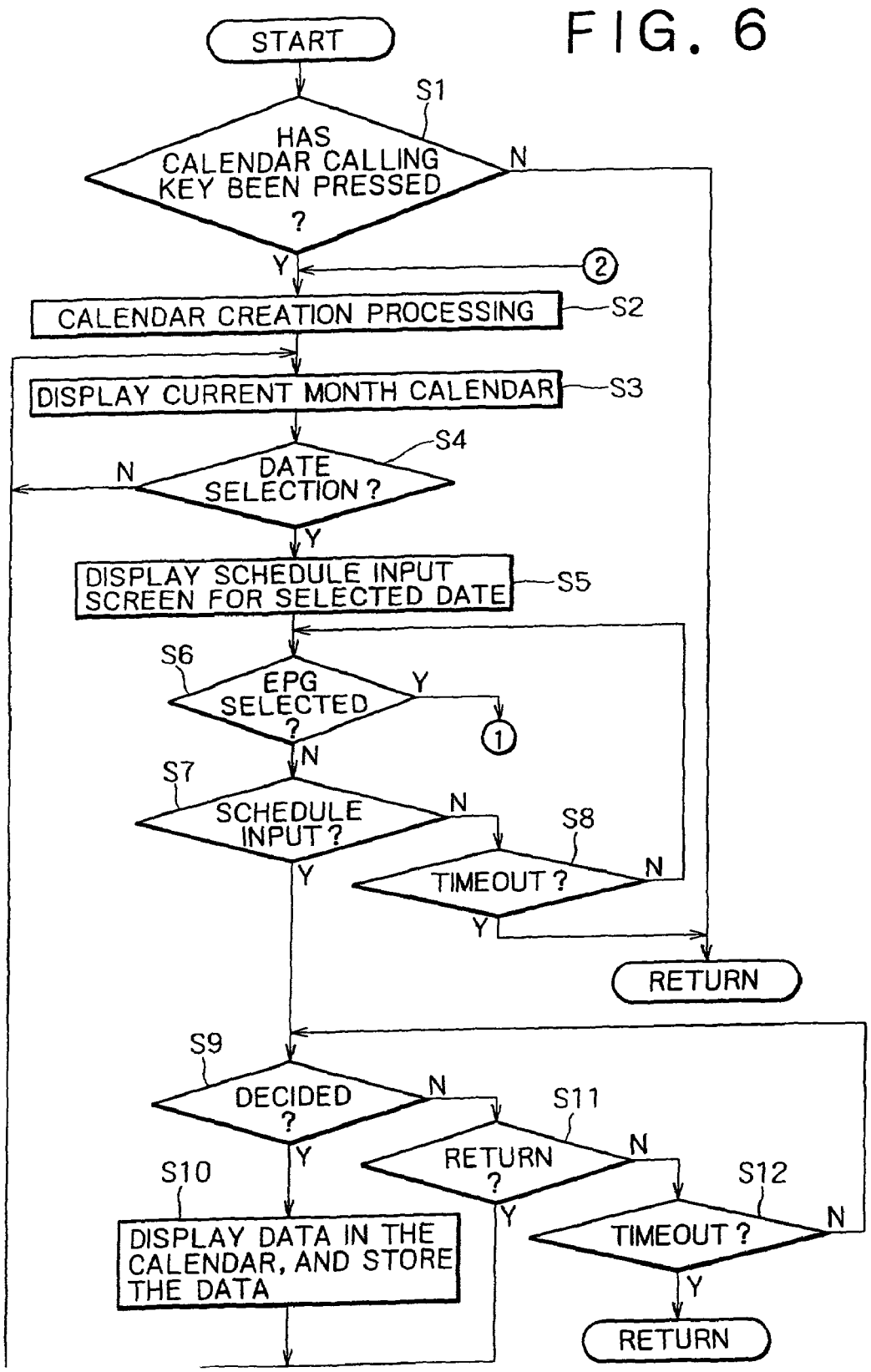
FIGS. 6 and 7 are a flowchart illustrating input processing of schedule information, and setting processing of a program viewing reservation and a recording reservation.
Figure 7:
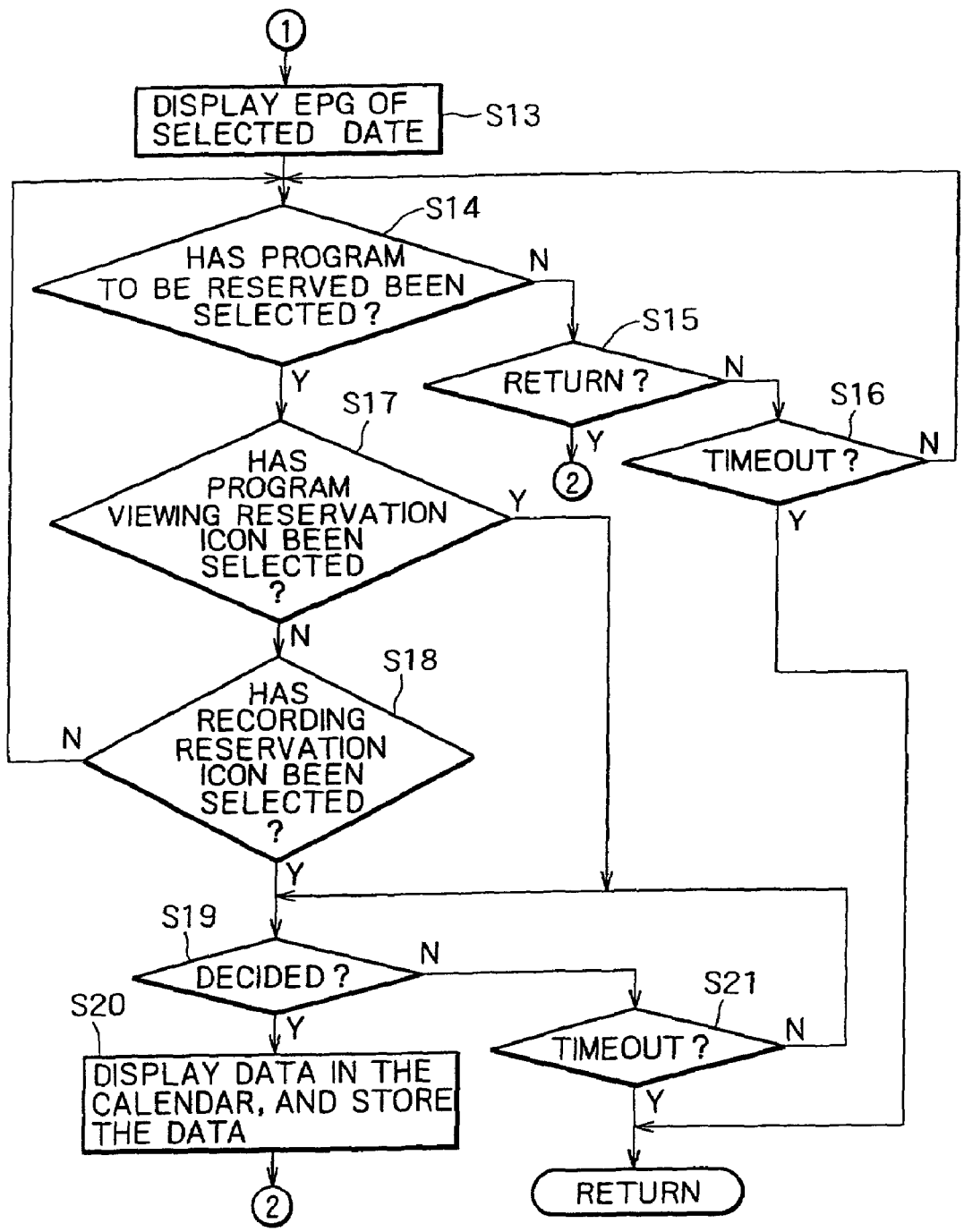

Next, the setting process for schedule information input, program viewing reservation, and recording reservation, which are performed in the television receiver of this embodiment described with reference to FIGS. 2 through 5, is described with reference to the flowcharts of FIGS. 6 and 7. The process shown in FIGS. 6 and 7 is performed in the control section 100 of the television receiver that has received a remote control signal from the remote controller 30.

When the control section 100 of the television receiver receives a remote control signal from the remote controller 30, the control section 100 determines whether the received remote control signal has been provided in response to a key input for calling a calendar (step S1). In the determination process of step S1, if the control section 100 determines that the received remote control signal has not been provided in response to a calendar calling key, the control section 100 ends the process shown in FIGS. 6 and 7, and performs another process in response to the received remote control signal.

In the determination process of step S1, if the control section 100 determines that the remote control signal from the remote controller 30 has been provided in response to the calendar calling key, the control section 100 performs the following: refers to current year, month, and day of the clock circuit 21; creates a calendar (schedule table that includes calendar information) of a month that includes the current year, month, and day (that is to say, this month) (step S2); and displays the calendar on the display 8 through the OSD processing section 6 and the video-signal processing circuit 7 as described above using FIG. 2 (step S3).

Next, the control section 100 determines whether a date in the displayed calendar has been selected (step S4). To be more specific, the determination process of step S4 determines whether a date in the calendar has been selected by the pressing of the decision key. If the control section 100 determines that no date has been selected in the determination process of step S4, the process from step S3 is repeated.

If the control section determines that a date has been selected in the determination process of step S4, the control section 100, as shown in FIG. 3, displays a schedule input screen of the selected date on the display 8 (step S5), and accepts a schedule information input, and a selection input by the EPG icon 81 and the return icon 82.

The control section 100 of the television receiver determines whether the EPG icon 81 has been selected (step S6). If the control section determines that the EPG icon 81 has not been selected, then the control section 100 determines whether schedule information has been input (step S7).

In the determination process of step S7, if the control section 100 determines that schedule information has not been input, the control section 100 determines whether a predetermined definite period of time has elapsed; that is to say, the control section 100 determines whether a timeout has occurred (step S8). In the determination process of step S8, if the control section 100 determines that the definite time has not elapsed, the process from step S6 is repeated.

In addition, in the determination process of step S8, if the control section 100 determines that neither the selection of the EPG icon 81 nor the input of given information have been made from the schedule input screen display within the definite period of time, in other words, if the control section 100 determines that a timeout has occurred, the control section 100 ends the process shown in FIGS. 6 and 7. After that, the television receiver enters, for example, a state in which it waits for an instruction to perform a new process.

Moreover, in the determination process of step S7, if the control section 100 determines that schedule information has been input, the control section 100 determines whether the decision key of the remote controller 30 has been pressed (step S9). In the determination process of step S9, if the control section 100 determines that the decision key has been pressed, the control section 100 adds the input schedule information to the calendar, stores the input schedule information in, for example, a schedule-information storing area of the EEPROM 104 (step S10), and repeats the process from step S3.

As a result, the calendar, which also includes the newly input schedule information, is displayed, allowing the user to input more schedule information.

Moreover, in the determination process of step S9, if the control section 100 determines that the decision key of the remote controller 30 has not been pressed, the control section 100 determines whether the return icon 83 has been selected (step S11). In the determination process of step S11, if the control section 100 determines that the return icon 81 has been selected, the control section 100 repeats the process from step S3, and displays the calendar again, allowing the user to input schedule information.

In the determination process of step S11, if the control section 100 determines that the return icon 82 has not been selected, the control section 100 determines whether a predetermined definite period of time has elapsed since the schedule information input; that is to say, the control section 100 determines whether a timeout has occurred (step S12). In the determination process of step S12, if the control section 100 determines that a timeout has not yet occurred, the process from step S9 is repeated.

In the determination process of step S12, if the control section 100 determines that the decision key has not been pressed and the return icon 82 has not been selected within the predetermined definite period of time after the schedule information input, in other words, if the control section 100 determines that a timeout has occurred, the control section 100 ends the process shown in FIGS. 6 and 7 in the television receiver, and then enters, for example, a state in which it waits for an instruction to perform a new process.

In this manner, the processing section shown in FIG. 6 is a processing section for inputting schedule information in the calendar as the schedule table. In the determination process of step S6 shown in FIG. 6, if the control section determines that the EPG icon 81 has been selected in the schedule input screen displayed in the step S5 shown in FIG. 3, the control section 100 displays an EPG having the selected date on the display 8, as shown in FIG. 7 (step S13).

Then, the control section 100 determines whether the broadcast program, for which program viewing reservation or recording reservation is desired, has been selected (step S14). In the determination process of step S14, if the control section 100 determines that the broadcast program for which reservation is desired has not been selected, the control section 100 determines whether the return icon 93 has been selected in the EPG display screen shown in FIG. 4 (step S15).

In the determination process of step S15, if the control section 100 determines that the return icon 93 has been selected, the control section 100 repeats the process from step S2 in FIG. 6. In the determination process of step S15, if the control section 100 determines that the return icon 93 has not been selected, the control section 100 determines whether neither the broadcast program nor the return icon has been selected within a predetermined definite period of time after the EPG display, and as a result, a timeout has occurred (step S16).

In the determination process of step S16, if the control section 100 determines that a timeout has not yet occurred, the control section 100 repeats the process from step S14. On the other hand, in the determination process of step S16, if the control section 100 determines that a timeout has occurred, the control section 100 ends the process shown in FIGS. 6 and 7 in the television receiver, and then enters, for example, a state in which it waits for an instruction to perform a new process.

In the determination process of step S14, if the control section 100 determines that the broadcast program for which reservation is desired has been selected, the control section 100 determines whether the program viewing reservation icon 91 has been selected in the EPG display screen shown in FIG. 4 (step S17). If the control section 100 determines that the program viewing reservation icon 91 has been selected, the control section 100 proceeds to the determination process of step S19.

In the determination process of step S17, if the control section 100 determines that the program viewing reservation icon 91 has not been selected, the control section 100 determines whether the recording reservation icon 92 has been selected (step S18). If the control section 100 determines that the recording reservation icon has not been selected in the determination process of step S18, the control section 100 repeats the process from step S14.

Then, if the control section 100 determines that the program viewing reservation icon 91 has been selected in the determination process of step S17 described above, or if the control section 100 determines that the recording reservation icon has been selected in the determination process of step S18, the control section 100 determines whether the decision key of the remote controller 30 has been pressed (step S19).

Then, if the control section 100 determines that the decision key of the remote controller 30 has been pressed in the determination process of step S19, it is determined that the broadcast program, for which program viewing reservation or recording reservation is desired, has been decided. After that, as described above using FIG. 5, the control section 100 adds setting information for the program viewing reservation or setting information for the recording reservation to the calendar, and stores the setting information for the program viewing reservation or the setting information for the recording reservation in the EEPROM 104 (step S20). After the process of step S20, the control section 100 repeats the process from step S2 shown in FIG. 6, inputs schedule information into the calendar, and sets the program viewing reservation and the recording reservation.

On the other hand, in the determination process of step S19, if the control section 100 determines that the decision key has not been pressed, the control section 100 determines whether the decision key has been pressed within a predetermined definite period of time after the selection of the broadcast program to be reserved; that is to say, the control section 100 determines whether a timeout has occurred (step S21).

In the determination process of step S21, if the control section 100 determines that a timeout has not yet occurred, the control section 100 repeats the process from step S19. On the other hand, in the determination process of step S21, if the control section 100 determines that a timeout has occurred, the control section 100 ends the process shown in FIGS. 6 and 7, and then enters, for example, a state in which it waits for an instruction to perform a new process.

In this manner, the television receiver of this embodiment is capable of setting a recording reservation and a program viewing reservation of a broadcast program using the calendar as the schedule table and the EPG. Accordingly, the user can perform the recording reservation and the program viewing reservation taking the user's own schedule into consideration. In addition, because it is not necessary to input setting information such as broadcast start time, broadcast end time, and a broadcast channel in relation to the target broadcast program, the user can perform the recording reservation and the program viewing reservation correctly and easily.

In this connection, in this embodiment, the television receiver is configured to allow the user to input schedule information, and to set the program viewing reservation and the recording reservation after displaying the calendar as the schedule table and selecting a date. However, it is not limited to this. For example, the television receiver can also be configured to display an EPG immediately, without displaying the schedule input screen, to allow the user to set the program viewing reservation and the recording reservation through the EPG by selecting a date after selecting the EPG icon, which is provided in the left end portion of the screen, in the display screen of the calendar shown in FIG. 2.

Additionally, when a program viewing reservation is performed, and when a recording reservation is performed, a date display area, which corresponds to the date selected in the calendar, displays information almost in the same manner. However, adding a display for clearly differentiating between a program viewing reservation and a recording reservation enables clear notification of the kind of reservation made, that is, a program viewing reservation or a recording reservation. Of course, the setting information of a program viewing reservation and the setting information of a recording reservation, which are set to the EEPROM 104, can be differentiated by, for example, flag information, and the like, which are added.

Moreover, in the above-mentioned embodiment, displaying the calendar, which includes the current year, month, and day, is described. However, it is not limited to this. It is also possible to configure the calendar to allow the user to specify a month, which the user wishes to display, in the beginning. In addition, while displaying, in the beginning, a calendar that includes the current year, month, and day, it is also possible to display a past calendar for checking, and to display a future calendar to record a schedule determined earlier, by using the arrow keys, and the like, for scrolling and form feeding of the calendar.

Furthermore, the calendar can also be configured to allow the user to cancel (clear) the input schedule information and the setting of the program viewing reservation and the recording reservation information by adding a cancel icon to the calendar display. Additionally, the calendar is also configured to allow the user to modify the input schedule information of the calendar.

Moreover, in the above-mentioned embodiment, the display 8 is a CRT display, which is configured to accept an input by a user's operation using the remote controller 30. However, it is not limited to this. It is also possible to configure a thin television receiver using, for example, an LCD (Liquid Crystal Display) for a display.

Moreover, attaching a touch panel to a display surface of the CRT display or the LCD enables the user to select a date from the calendar, and to input schedule information using a software keyboard, through easy operation, that is, touching the display surface of the display with a finger or the like. Providing a decision icon also enables the user to perform a decision input through the decision icon in the display screen.

In the embodiment described above, the reservation information setting apparatus and the method thereof according to the present invention were described using an example in which they are applied to a digital television receiver that has a function of receiving satellite broadcasts and functions of recording/playback broadcast programs. However, the reservation information setting apparatus and the method thereof according to the present invention are effective not only for the digital television receiver described above. The present invention can be applied to various kinds of receivers having a function of receiving broadcast signals in various forms including, for example, television broadcast signals, radio broadcast signals, broadcast signals of data broadcasts, satellite broadcast signals, cable television broadcasts, and the like. In addition, the present invention can be applied to various kinds of electric equipment including the following: communications equipment provided with programs through a communication network such as the Internet; personal computers; and recording apparatus such as a VTR, STB, IRD, and MD (MiniDisc).

Moreover, the present invention can also be applied to a relay apparatus (base apparatus) for information signals and control signals which connects information output apparatus such as a VTR and STB with information input apparatus such as a monitor receiver by wire or by wireless means. Furthermore, it is also possible to apply the present invention to a remote command unit that comprises a display element having a comparatively large display screen.

To be more specific, the present invention can be applied to various kinds of equipment including the following: a receiver that receives various kinds of broadcast signals and information signals; various kinds of information output apparatus that output information signals such as video signals and audio signals, and that deliver the signals to other electronic equipment and users; an information-signal input apparatus that accepts an information signal input; a recording apparatus that records broadcast signals and information signals; and others.

In short, the present invention can be applied to any apparatus as long as the apparatus has the following functions: a function of forming a signal for displaying a calendar as a schedule table; a function of accepting date selection in the schedule table; a function of accepting schedule information for the schedule table; and a function of accepting reservation information. In this case, the schedule table, which is displayed by the signal formed by the function of forming the signal for displaying the schedule table, may be displayed on its own display element, or may be supplied to another separate apparatus to display the schedule table on a display element of the separate apparatus.

Moreover, of course, the function of accepting date selection in the schedule table, the function of accepting schedule information for the schedule table, and the function of accepting the reservation information may be configured to accept not only a direct input by a user's operation, but also an input delivered from other electronic equipment by wire or by wireless means.

In addition, the television receiver of the above-mentioned embodiment is described as a receiver capable of receiving only satellite broadcast signals. However, the present invention can also be applied to a receiver having a combined function of receiving not only satellite broadcast signals but also broadcast signals of various broadcasts such as terrestrial broadcasts, data broadcasts, and cable broadcasts.

The reservation process may be varied depending on the function of the apparatus. For example, in the case of a receiver, only program viewing reservation is performed; and in the case of recording equipment such as a VTR and a digital VTR, or a DVD recording/playback apparatus, only recording reservation is performed.

Moreover, in the embodiment described above, the EPG as the broadcast program guide is formed using information for forming the EPG, which is provided as information included in the satellite broadcast signal, to allow the user to select the target broadcast program by using this EPG. However, it is not limited to this.

For example, broadcast program guide information, which is used for forming the broadcast program guide for display, may be provided periodically through the Internet or a telephone network. In addition, as is the case with monthly magazines and weekly magazines, the broadcast program guide information may be provided, of course, through a recording medium by selling a recording medium such as a CD-ROM and a floppy disk.

Additionally, as is the case with the schedule information input to the calendar without using the broadcast program guide, of course, the program viewing reservation and the recording reservation may be performed by inputting the broadcast start time, broadcast channel, program identification information, and broadcast end time, and the like on the target day.

Moreover, the present invention can also be applied to so-called audio equipment including a receiver of radio broadcasts, a cassette tape recorder, and a small magneto-optical-disc recording/playback apparatus called MD (Mini-Disc).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A schedule apparatus, comprising:
   means for receiving electronic program guide (EPG) information;
   means for creating a calendar and displaying the created calendar on a display device;
   means for determining whether a date from said calendar has been selected, for determining, when a date has been selected, whether a request for the EPG information has been made for the selected date, for determining, when the request for the EPG information has not been made, whether an input of user schedule information has been made for the selected date within a predetermined period of time, and for performing timeout if no request for the EPG information and no input of user schedule information has been made for the selected date during the predetermined period of time;
   means, responsive to a determination from the determining means that the date has been selected, for accepting an input of user schedule information in which a user is able to edit a personal event or events of the selected day, and responsive to determinations from the determining means that the date has been selected and that the request for the EPG information has been made for causing said EPG information which comprises at least program guide information of the selected date to be displayed and for accepting a viewing reservation schedule for a desired electronic broadcast program or programs; and
   means for controlling display of the schedule information of the user's personal event or events and schedule information of the electronic broadcast program or programs to be viewed on said calendar,
   the personal event or events comprising events unrelated to the request for the EPG information, and
   the text of the schedule information of the electronic broadcast program or programs being displayed on the calendar, the text comprises at least the start time and the broadcast channel of the broadcast program or programs.

2. A method for providing a schedule on a display screen of a monitor device, said method comprising:

receiving electronic program guide (EPG) information;

creating a calendar and displaying the created calendar on the display screen;

determining whether a date from said calendar has been selected, and when a date from said calendar has been selected, whether a request for the EPG information has been made for the selected date, for determining, when the request for the EPG information has not been made, whether an input of user schedule information has been made for the selected date within a predetermined period of time, and performing timeout if no request for the EPG information and no input of user schedule information has been made for the selected date during the predetermined period of time;

in response to a determination that the date has been selected, accepting an input of user schedule information in which a user is able to edit a personal event or events of the selected day, and in response to determinations that the date has been selected and that the request for the EPG information has been made causing said EPG information which comprises at least program guide information of the selected date to be displayed and accepting a viewing reservation schedule for a desired electronic broadcast program or programs; and controlling display of the schedule information of the user's personal event or events and schedule information of the electronic broadcast program or programs to be viewed on said calendar, the personal event or events comprising events unrelated to the request for the EPG information, and the text of the schedule information of the electronic broadcast program or programs being displayed on the calendar, the text comprises at least the start time and the broadcast channel of the broadcast program or programs.

* * * * *